United States Patent
Aldrin

(10) Patent No.: US 9,942,099 B2
(45) Date of Patent: Apr. 10, 2018

(54) METHODOLOGY AND APPARATUS FOR TOPOLOGY DISCOVERY AND MAPPING OF CHAINED NETWORK SERVICES

(71) Applicant: Futurewei Technologies, Inc., Plano, TX (US)

(72) Inventor: Sam Aldrin, Santa Clara, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 102 days.

(21) Appl. No.: 14/541,083

(22) Filed: Nov. 13, 2014

(65) Prior Publication Data
US 2015/0131484 A1 May 14, 2015

Related U.S. Application Data

(60) Provisional application No. 61/903,719, filed on Nov. 13, 2013.

(51) Int. Cl.
*H04L 12/24* (2006.01)
*H04L 12/26* (2006.01)

(52) U.S. Cl.
CPC .......... *H04L 41/12* (2013.01); *H04L 41/5058* (2013.01); *H04L 43/50* (2013.01)

(58) Field of Classification Search
CPC ..... H04L 41/12; H04L 41/5058; H04L 43/50; H04L 45/02; H04L 45/74; H04L 69/22; H04L 67/10
See application file for complete search history.

(56) References Cited

U.S. PATENT DOCUMENTS

| | | | | |
|---|---|---|---|---|
| 6,363,056 B1 * | 3/2002 | Beigi | ...................... | H04L 41/12 370/252 |
| 8,675,517 B2 * | 3/2014 | Swan | .................. | H04L 41/0213 370/254 |
| 8,767,587 B1 * | 7/2014 | Finn | ..................... | H04L 12/2416 370/255 |
| 9,130,837 B2 * | 9/2015 | Bjarnason | ........... | H04L 41/0809 |

(Continued)

OTHER PUBLICATIONS

"ITU-T Recommendation Y.1730—Operations and Mainentance functions and mechanisms for ethernet-based networks", Feb. 2008, Sections 7.3, 9.5, 9.6, and Appendix B.*

(Continued)

*Primary Examiner* — Asad Nawaz
*Assistant Examiner* — Thomas R Cairns
(74) *Attorney, Agent, or Firm* — Vierra Magen Marcus LLP

(57) ABSTRACT

Techniques for mapping a topology of a chain of network service functions on a computer network are described. A request packet is sent to an ingress service function on the network. The request packet is encapsulated with a network service header, which identifies the packet as an OAM packet, and an OAM payload. Where the packet is received by a service function that is not an egress service function, the request packet is forwarded to the next service function hop in the chain. Where the packet is an egress service function, the request packet is returned to the discovery source. A service path is constructed based on the metadata in the OAM payload describing the identified the service functions. This technique can be applied to multiple connected chains to provide a complete mapping of the network topography.

20 Claims, 7 Drawing Sheets

(56) References Cited

U.S. PATENT DOCUMENTS

2014/0362682 A1* 12/2014 Guichard ............ H04L 41/5038
370/221
2014/0362857 A1* 12/2014 Guichard .............. H04L 45/566
370/392

OTHER PUBLICATIONS

Mizrahi et al, "An Overview of OPerations, Administration, and Maintenance (OAM) Mechanics", Sep. 12, 2012—sections 3.1, 3.2, 3.4, and 3.7.3.2.*

Kessler et al, "A Primer on Internet and TCP/IP Tools and Utilities", RFC 2151, Jun. 1997, pp. 6-11 sections 3.2-3.4.*

Kompella et al, "Detecting Multip-Procol Label Switched (MPLS) Data Plane Failures", RFC 4379, Feb. 2006, secions 3.3, 7.1, and pp. 33-34.*

Aggarwal et al, "Bidirectional Forwardig Detection (BFD) for MPLS Label Switched Paths (LSPs)", RFC 5884, Jun. 2010, sections 4 and 7.*

Gray et al, "MPLS On-Demand Connectivity Verification and Route Tracing", RFC 6426, Nov. 2011, sections 1.1, 1.2, and 2.1.*

"ITU-T Recommendation Y.1711—Operation & Maintenance mechanism for MPLS networks", Feb. 2004, section 6.*

* cited by examiner

500

510

METHODOLOGY AND APPARATUS FOR TOPOLOGY DISCOVERY AND MAPPING OF CHAINED NETWORK SERVICES

CROSS-REFERENCE TO RELATED APPLICATIONS

The present application claims priority to provisional application Ser. No. 61/903,719, filed on Nov. 13, 2013, entitled "METHODOLOGY AND APPARATUS FOR TOPOLOGY DISCOVERY AND MAPPING OF CHAINED NETWORK SERVICES" naming the same inventors as in the present application. The contents of the above referenced provisional application are incorporated by reference, the same as if fully set forth herein.

FIELD

The present invention generally relates to the field of network topology mapping. More specifically, the present invention relates to discovery and mapping of chained network service functions.

BACKGROUND

There is a growing need in the field of computer networks for discovery and mapping of service functions provided by and on a network. Discovery and mapping of service functions are often difficult because of recent advances in virtualization that have allowed service functions to be maintained in a virtual state, e.g., without being physically present on the network as a separate hardware component. When virtual network services are chained together in this manner, there is no simple way to identify and/or discover the services and how they are chained together.

In the majority of network designs and deployments, network functions are configured physically at a given network element. This requires allocation of physical resources to enable the network functions. With the development of virtualization and new services, the physical resources required to support these network functions have increased at a rapid pace. Therefore, there is a great need for configuring and managing various network services programmatically.

With large scale services being deployed and customized by customers on an as-needed basis, the ability to link various services is complex. Furthermore, the ability to chain various services may be limited to specific vendor and/or device types, making managing and maintenance of these services a great hardship for administrators. As such, enabling new services often requires re-designing all or part of the network in order to create the requisite service chain workflow to incorporate new service functions.

Unlike physical layout topology, mapping out potentially dissimilar services chained together is not achievable with per-layer Operations, Administration, and Maintenance ("OAM") mechanisms. More importantly, the services may be virtual and not necessarily co-located with other service functions. For example, services like firewall, deep packet inspection ("DPI"), policy configurations, load balancing, etc., may be chained together to create a service chain workflow. By utilizing a DPI OAM, it may not be possible to verify the existence of other service chain functions and the order of the services in the chain. This creates a need to discover service functions and enable service function topology mapping, which may span across multiple devices or entities, or may be limited to a single device, in order to enable all of the services within the service chain. Similarly, there is a need to map out various service chains such that one may identify different service chains, verify their existence on a network, and determine how the service chains are linked to each other, etc.

SUMMARY

Network services are traditionally provided by configuring network elements and allocating resources in order to provide network functions. These functions are linked together to create a service flow based on the requirement of network design. One embodiment of the present invention describes a methodology and apparatus to identify and discover configured network services, which are linked together as a physical or virtual entity, and create a topology map of the discovered service configurations and the order of chaining from service function ingress to an egress service function of the chain. A mechanism and apparatus for mapping the topology of various service chains on a given network systems are also disclosed in embodiments of the present invention.

Another embodiment describes a method of mapping a chain of network service functions on a computer network. A request packet is sent to a first service function on the network. The request packet is encapsulated with a network service header, which identifies the packet as an OAM packet, and an OAM payload. Where the service function is not an egress service function, the request packet is forwarded to the next service function or 'hop' in the chain. At each hop, metadata describing the identity of the current service function is added to the OAM payload. Alternatively, where the service function is an egress service function, the request packet is returned to the discovery source. A service path is constructed based on the combined metadata in the OAM payload describing the identified the service functions.

In some embodiments, the OAM payload contains a field describing the OAM function type and a field that contains OAM function data. The OAM function data is used to store metadata at each hop that describes the identified service functions on the network.

Another described embodiment discloses an apparatus with a discovery source circuit, and a plurality of service functions chained together on a computer network. The apparatus is configured wherein the source circuit forms an OAM packet with a service header and sends the packet to a service function on the network. Furthermore, the plurality of service functions are configured such that at each service function that receives the OAM packet, metadata identifying the function type of the service function is added to a received OAM packet. After the meta data is added, the service function is configured to return the OAM packet to the discovery source if the service function is an egress service function. Otherwise the service function is configured to forward the OAM packet to the next service function in the chain. Based on the combined metadata identifying the functions of the plurality of service functions that is received by the discovery source, the discovery source is further configured to map the topology of the service function chain based on the metadata in the OAM packet received from the egress service function.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
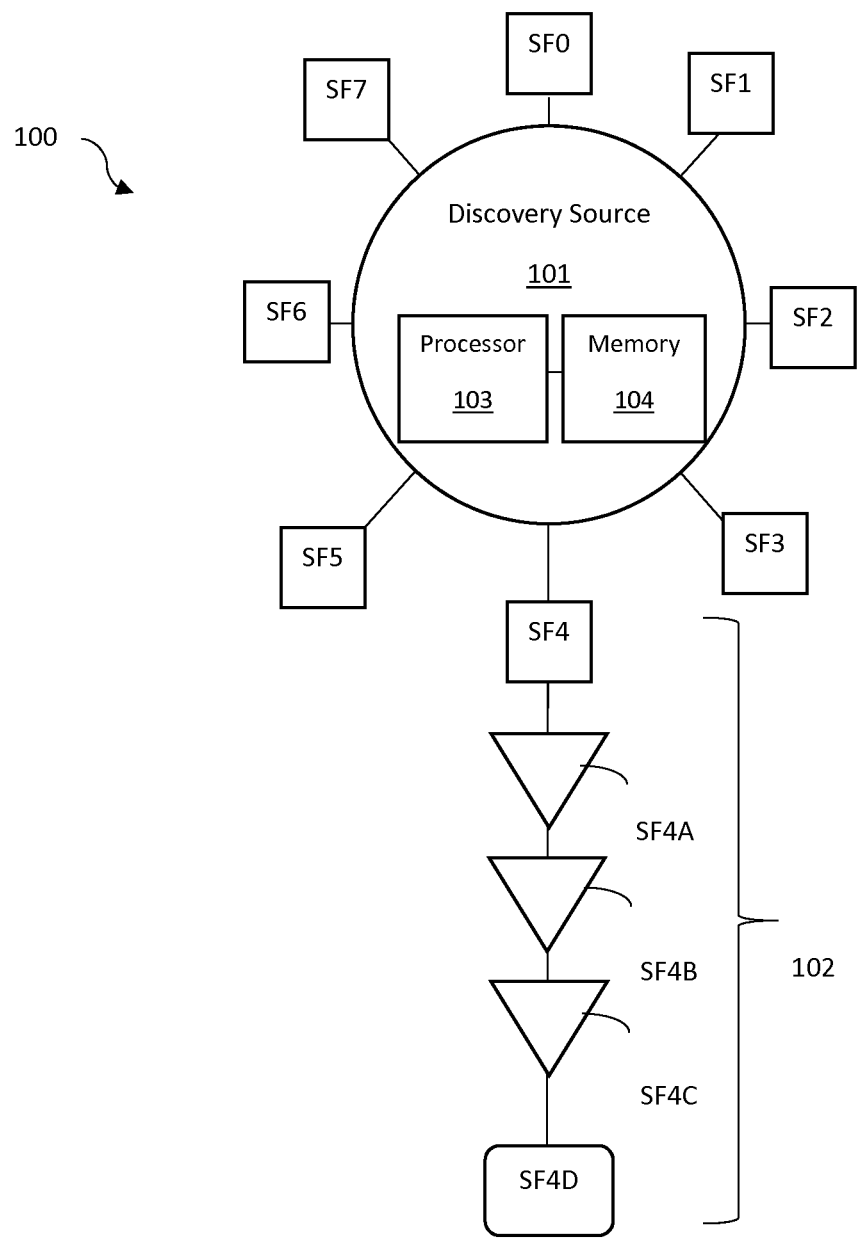
FIG. 1 is a block diagram illustrating an exemplary discovery source connected to a service function chain according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 2, 3, 6, and 7) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Topology Discovery and Mapping of Chained Network Services

In the following embodiments, techniques for mapping, discovering and verifying a topology of a chain of network service functions on a computer network are disclosed. One approach forms a request packet at a discovery source to send to a service function on the computer network. The request packet is encapsulated with a network service header indicating that the packet is an OAM packet. At each service function hop in the chain, metadata identifying the service function is added to the OAM payload thereby creating combined metadata. Where the packet is received at an egress service function, the packet is processed and returned back to the discovery source. Where the packet is received by a service function that is not an egress service function, the packet is processed and forwarded to the next service function hop in the chain. A service path for the chain of network services is constructed based on the combined metadata in the OAM payload of the request packet.

In some embodiments, a request packet will also contain a field indicating if the packet type is set to 'reply' or 'process-and-forward'. Where the request packet is of the 'process-and-forward' type, the request packet is forwarded to the next service function hop in the chain. Where the request packet is of the 'reply' type, the request packet is sent back to the source.

With reference to FIG. 1, a block diagram illustrating an exemplary computer network 100 including a discovery source 101 (e.g., "circuit") connected to a plurality of service functions is depicted according to embodiments of the present invention. As depicted, discovery source 101 comprises a processor 103 and memory 104 and is connected to a plurality of service functions (e.g., SF0-SF6). Processor 103 may be a general purpose processor (e.g., CPU) or a network processor, for example. Processor 103 may be coupled to memory 104 for storing data and instructions. Each service function SF0-SF6 may be an ingress service function of a service function chain. For example, SF4 is an ingress service function of service function chain 102. Service function chain 102 comprises service function SF4A, SF4B, SF4C, and SF4D. SF4D is an egress service function. Each service function in the service function chain has a next hop. For example, the next hop of SF4 is SF4A, and the next hop of SF4A is SF4B. When a packet is received by an egress service function (e.g., service function SF4D), the packet is processed and/or returned to discovery source 101 for topology discovery.

There are multiple methods of mapping topology of service functions in the service function chain. One method provides end-to-end topology mapping. Another method produces a partial topology map. For both of these methods, discovering the service function is the common task at a given service function hop.

As mentioned above, when a service function receives an OAM packet with discovery request, it has multiple modes, including 'reply' and 'process-and-forward' (see Table 1). If the mode is 'reply', the service function will reply back with service function details marked in the reply packet. This will be done if the service function is the egress service function in the chain. Where the request is 'process-and-forward', the service function will process and forward the packet to the next service function in the chain with a time-to-live ("TTL") in service header having a value of 1, for instance. When the service function is being discovered and identified, details regarding the service function (e.g., service function type) will be inserted into the response type-length-value sequence ("TLV"). The requester may also request specific service function details which the service function may include in the response.

In the end-to-end topology map, the service functions are mapped from an ingress service function to an egress service function of the network service chain. When the request packet is sourced by the ingress service function, the ingress service function will encapsulate the packet with a network service header and mark it as an OAM packet in the service header. The OAM payload consists of the request type and the TLV values for service functions it has identified along the way in the network service chain.

TABLE 1

<oam payload>Type = Discover | oam function type = process and forward | data for the oam function|

In order to map the topology end to end, the service functions in the chain are identified. Service function identification requires a hop to mark the service function identifications, package them into the request, and forward the packet to the next service function. In the case of an egress service function, the response packet identifying the service functions will be sent back to the source of the request.

TABLE 2

<oam payload> Type = Validation | oam function type | data for the oam function|

When a service function which cannot support the topology map request within the chain is encountered, the service function is unable to forward the packet to the next service function. The service function will reply back with an error code, for example, indicating that an unsupported OAM packet has been received. The source of the topology map request will receive the response and modify the request packet's TTL value to the next to service function which returned a failure and send a new request. The new request will be received by the service function directly after the service function in the chain from which the failed response is received.

Figure 2:
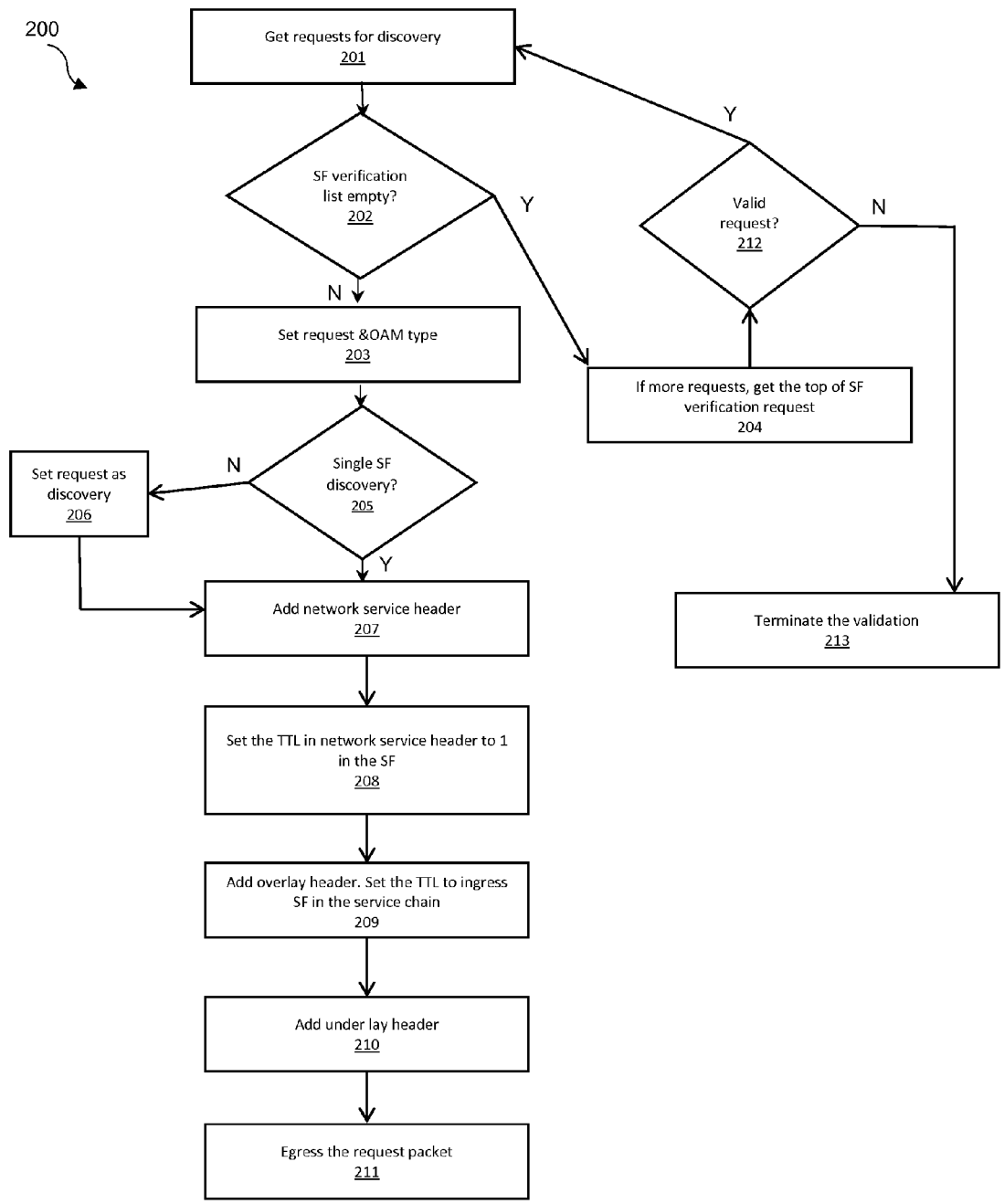
FIG. 2 is a flow diagram illustrating an exemplary method including a sequence of activities when generating a discovery request according to embodiments of the present invention.

With reference to FIG. 2, a flowchart 200 depicting a method of generating a request packet at a service function is depicted in accordance with embodiments of the present invention. Although specific steps are disclosed in flowchart 200, such steps are exemplary. That is, embodiments of the present invention are well suited to performing various other (additional) steps or variations of the steps recited in flowchart 200 may be performed in an order different than presented, and that not all of the steps in flowchart 200 may be performed.

At step 201 of FIG. 2, a packet with a request for discovery is received by the discovery source. A service function will first check the verification list for pending verifications at step 202. If the list of pending verifications is empty, at step 204, the discovery source waits for more requests to arrive and receives the top service function verification request. If the verification request is valid, at step 212, the method returns to step 201 and receives the request for discovery. If the validation request is invalid, the validation is terminated at step 213.

With reference to step 203, where the verification list is not empty, the discovery source sets the request for the request packet as an OAM type request packet. Next, it is determined whether the discovery request is for a single service function at step 205. If the request is not for a single service function, the request type is set as 'discovery' at step 206. If the request is for a single service function, the method proceeds to step 207. At step 207, a network service header is added to the request packet. At step 208, the TTL field in the network service header is set to a value of 1, for instance. At step 209, an overlay header is added to the packet and the TTL field of the overlay header is set to the ingress service function in the service chain. At step 210, an underlay header is added to the request packet. Finally, at step 211, the request packet is egressed.

Figure 3:
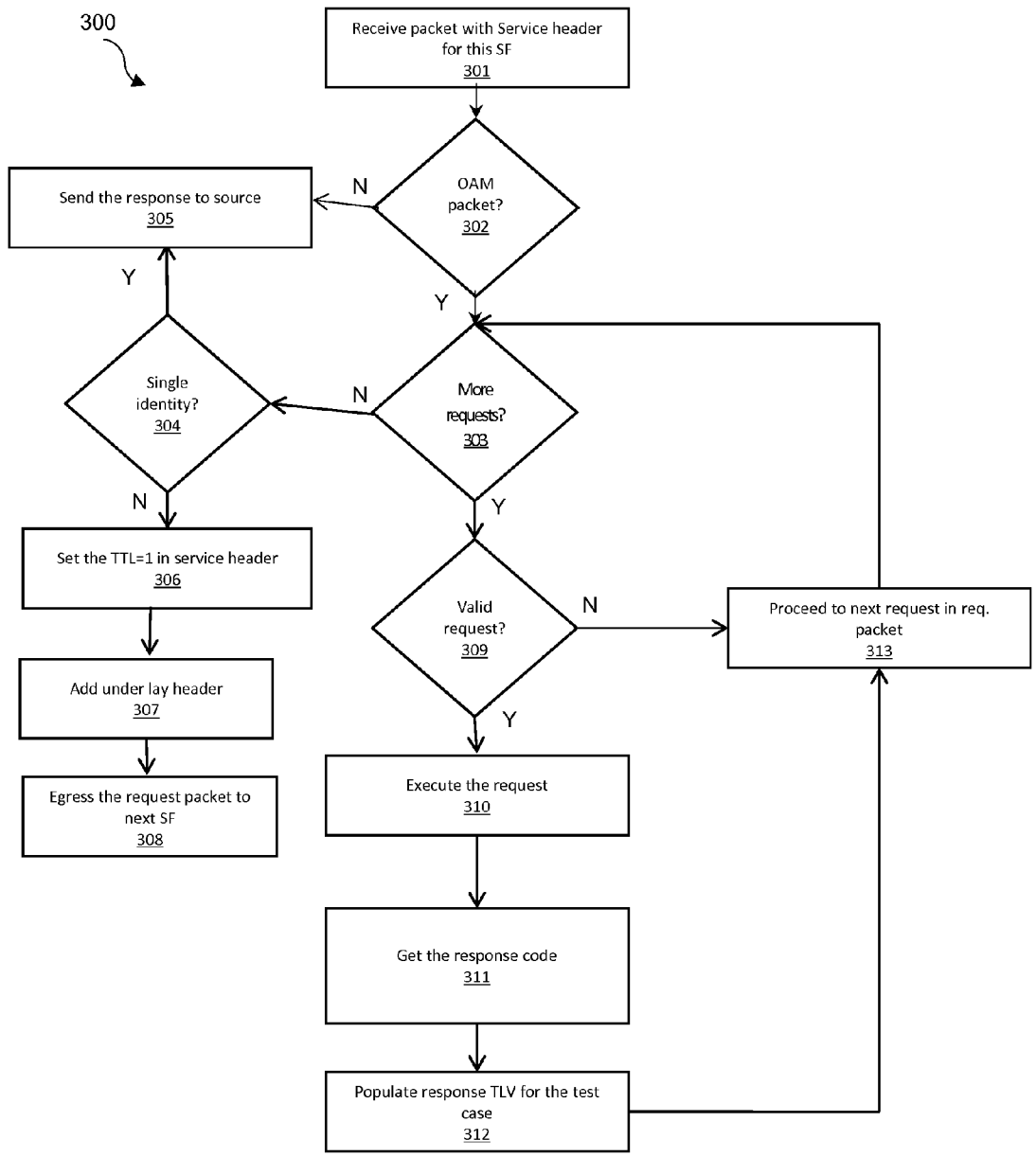
FIG. 3 is a flow diagram illustrating an exemplary method including a sequence of activities when generating a response to a discovery request according to embodiments of the present invention.

With reference to FIG. 3, a flowchart 300 depicting an exemplary method of generating a response packet at a service function is depicted, in accordance with embodiments of the present invention. Although specific steps are disclosed in flowchart 300, such steps are exemplary. That is, embodiments of the present invention are well suited to performing various other (additional) steps or variations of the steps recited in flowchart 300. It is appreciated that the steps in flowchart 300 may be performed in an order different than presented, and that not all of the steps in flowchart 300 may be performed.

With reference to step 301, an OAM request is received by a service function. At step 302, if it is determined that the packet is not an OAM type, a response is sent at step 305 to the source without further processing by the service function. If the request is an OAM type, the service function determines if there are additional test requests in the packet at step 303. At step 309, the method determines if the request is a valid request. Where the request is not a valid request, at step 313, the method proceeds to the next request in the request packet. After step 313, the method returns to step 303 and determines if there are additional test requests in the packet.

Where further testing is required at step 303, and the method determines that the request is valid at step 309, the OAM function is performed based on the request type at step 310 if the request is supported and can be performed. Once the OAM function completes, based on the verification and response type, the response is either sent to the initiator or further OAM functions are performed based on the OAM function requests stacked within the received request. The appropriate code is populated in the response packet at step 311, service function data is populated in the response TLV field at step 312, and the next request in the packet is processed at step 313.

If a mode of the request packet indicates that the response should be sent, the response is returned to the source at step 305. If the OAM request contains multiple identification requests at step 304, the response code is populated for the corresponding request before forwarding the OAM request to the next service function. For source based discovery, the source queries for each service function in the chain by modifying the TTL value in the service header for every subsequent request at step 306. The method will continue until it reaches the egress service function of the service chain. Only one service function request will be in the request but it may have multiple identification requests related to the queried service function. At step 307, an underlay header is added to the packet. If the service function is the egress service function in the service chain, the response packet having the response codes is sent back to the ingress/sourcing service function at step 308.

An important difference between verification and identification of the service functions is that in verification, the service function is validated for its function, while in identification, the purpose is to ensure the service function is at the correct location within the service chain. If the whole chain has to be identified and checked, then the OAM type could be set as 'Reply' or 'Process-and-Forward'. When a service function is to be identified in the chain (e.g., present or not present), the service chain is examined at each service function hop to see if it is the service function being queried for. To this end, an OAM packet with service function identifiers is constructed. The request type is set as 'identify'. Once the packet is received at a service function, it will check if the service function identification marking in the packet exactly matches the service function at the current hop. According to some embodiments, request packets use the data packet format to emulate data flow. This is useful when a data path along the service chain is to be tested and validated.

Figure 4A:
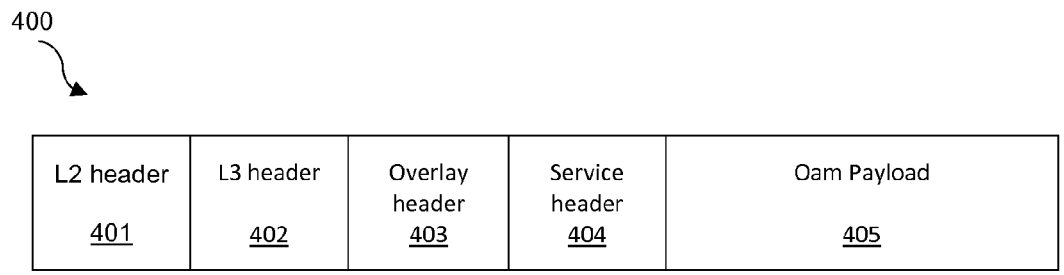
FIG. 4A is a diagram illustrating an exemplary general request packet format according to embodiments of the present invention.

With reference to FIG. 4A, an exemplary packet 400 is depicted in accordance with embodiments of the present invention. While packet 400 is shown as incorporating specific, enumerated features, it is understood that embodiments are well suited to applications involving additional, fewer, or different features or arrangements. As depicted in FIG. 4A, packet 400 includes L2 header 401, L3 header 402, overlay header 403, service header 404, and OAM payload 405.

Figure 4B:
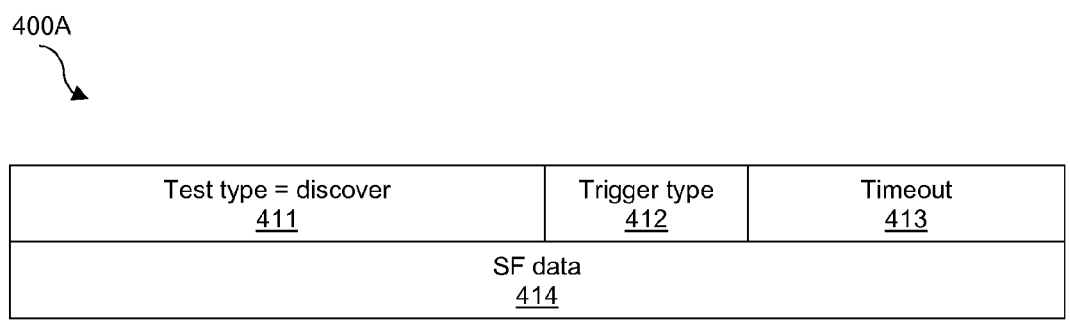
FIG. 4B is a diagram illustrating an exemplary test request/response packet format according to embodiments of the present invention.

With reference to FIG. 4B, an exemplary test request/response packet 410 is depicted, in accordance with embodiments of the present invention. While packet 410 is shown as incorporating specific, enumerated features, it is understood that embodiments are well suited to applications involving additional, fewer, or different features or arrangements. As depicted in FIG. 4B, test request/response packet 410 includes test type 411, trigger type 412, timeout 413, and service function data 414.

Figure 5A:
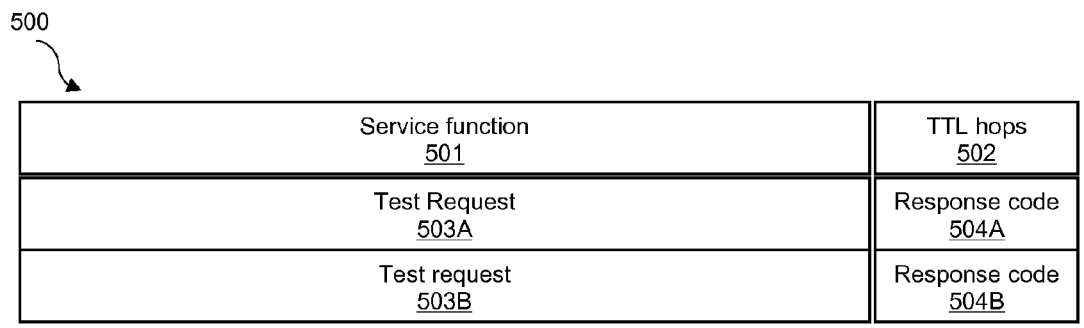
FIG. 5A is a diagram illustrating an exemplary service function test packet format according to embodiments of the present invention.

With reference to FIG. 5A, an exemplary service function test packet 500 is depicted in accordance with embodiments of the present invention. While service function test packet 500 is shown as incorporating specific, enumerated features, it is understood that embodiments are well suited to applications involving additional, fewer, or different features or arrangements. As shown, service function test packet 500 includes service function 501 and TTL field 502. Additionally, service function test packet 500 includes one or more test requests (e.g, test requests 503A and 503B). The test requests are paired with an appropriate response code (e.g., response codes 504A and 504B).

Figure 5B:
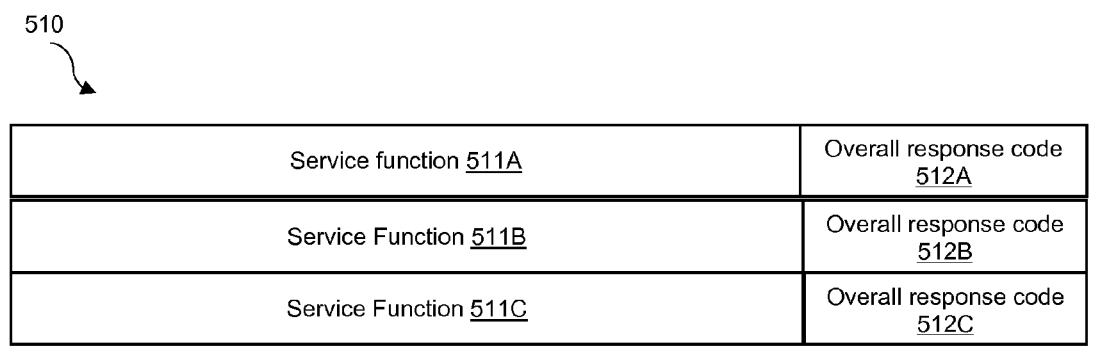
FIG. 5B is a diagram illustrating an exemplary OAM payload format with service function test requests according to embodiments of the present invention.

With reference to FIG. 5B, an exemplary OAM payload 510 is depicted in accordance with embodiments of the present invention. While OAM payload 510 is shown as incorporating specific, enumerated features, it is understood that embodiments are well suited to applications involving additional, fewer, or different features or arrangements. As shown, OAM payload 510 includes service functions that have been processed during the course of the request (e.g., Overall response code 512A, 512B, and 512C). The service functions are paired with an overall response code (e.g, overall response code 512A, 512B, and 512C).

Single Service Function Discovery Algorithm

Figure 6:
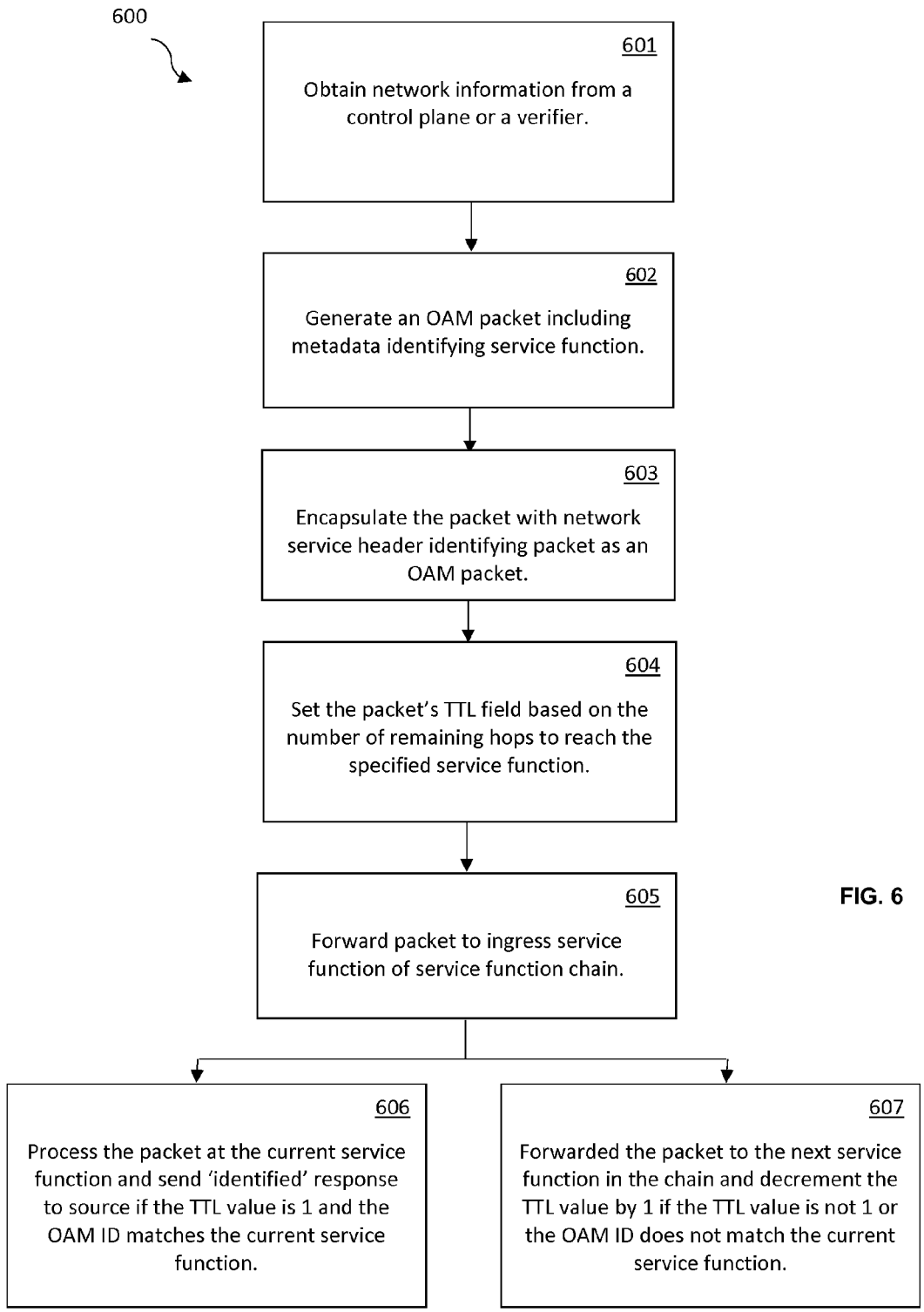
FIG. 6 is a flowchart illustrating an exemplary method of discovering a specific service function in a network in according to embodiments of the present invention.

With reference to FIG. 6, a flowchart 600 depicting a method of discovering a specific service function is depicted in accordance with embodiments of the present invention. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference to step 601 of FIG. 6, in accordance with embodiments of the present invention, to identify or verify a specific service function, network information is obtained from a control plane (e.g., control plan dB) or provided by a verifier. An OAM packet is generated by adding metadata specifically identifying the service function to be verified based on the network information at step 602 to form combined metadata. For example, to identify a DPI service function, the request is populated with metadata specific to the DPI service function. The packet is then encapsulated with a network service header comprising a marking that identifies the packet as an OAM packet at step 603. The TTL field in the service header is marked with a value based on the number of remaining hops to reach the specified service function in the chain at step 604. If the request is to identify the service function in the service chain, the TTL value in the service header is set to 1, the request type is set to 'identify', and the OAM type is set to 'process-and-forward'.

The packet may also be encapsulated with an overlay header and with outer headers (e.g., L3 and L2 headers), depending on the underlay/transport. The packet is forwarded as a normal data packet at step 605. Once the packet is received at the ingress service function of the service chain, the TTL value in the service header is checked. Because the TTL value is 1, the packet will be processed at the service function. If the service function OAM identification marking does not match the current service function, the packets is forwarded to the next service function in the chain and the TTL value is decremented by 1 at step 607. If the OAM markings in the packet matches the current service function, the service function will set the response code as 'identified' and reply back to the source at step 606.

If a test packet is not supported or not understood, the service function will populate the response indicating that the request is not supported or understood (e.g., an error code). The response packet includes appropriate service header details so that the source can identify the response and tie the response to the appropriate request. The response may be sent in-band or out of band based on the type marking in the request (e.g., rely, process-and-forward, etc.).

The source may continue to identify by checking with the next service function in the chain.

Service Function Chain Discovery Algorithm

Figure 7:
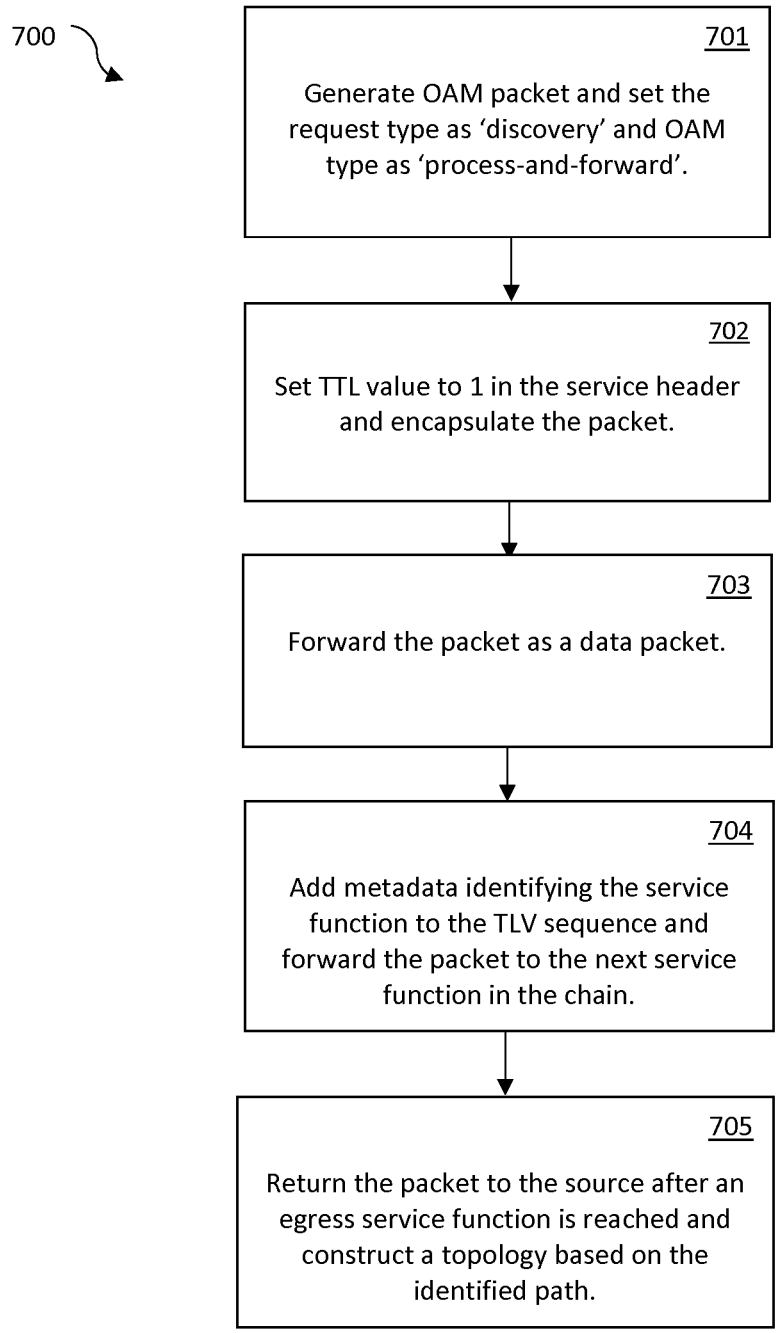
FIG. 7 is a flowchart illustrating an exemplary method of discovering a topology of a service function chain in a network according to embodiments of the present invention.

With reference to FIG. 7, a flowchart 700 depicting a method of discovering a topology of a service function chain is depicted in accordance with embodiments of the present invention. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

According to some embodiments of the present invention, to discover specific service functions and map a network chain topology, a service chain discovery is made by querying each of the service function in the chain. As depicted in step 701 of FIG. 7, an OAM packet is generated by setting the request type as 'discovery' and OAM type as 'process-and-forward'. The TTL value is set to 1 in the service header and the packet is encapsulated with all the network headers at step 702, and forwarded by the discovery source circuit as a data packet (e.g., forwarded to an ingress service function) at step 703. When a packet is received, the identity of the current service function is determined and metadata identifying the service function is added to the TLV sequence and the packet is forwarded to the next service function in the chain at step 704. For example, metadata describing the type of service function (e.g., DPI, Firewall, load balancer, etc.) is added to the request before forwarding the request to the next service function in the chain at step 705 to form (e.g., accumulate) combined metadata. If the packet is not for the current service function, the service function replies back to the source with the response. When the response is received at the source, the source may take further action based on the response code (e.g., error code).

As the packet proceeds through the service function chain as described above, when a response from the egress service function of the chain is received, the packet is returned to the discovery source circuit and identified service functions in the response may be used to construct the identified path for the network service chain at step 705. The procedure may be repeated for the remainder of the service chains in the network, and the entire network topology may be mapped from a given source. The same procedure may also be applied for a partial segment discovery (e.g., one or more hops) of a service chain, as well.

Embodiments of the present invention are thus described. While the present invention has been described in particular embodiments, it should be appreciated that the present invention should not be construed as limited by such embodiments, but rather construed according to the following claims.

What is claimed is:

1. A method of mapping a chain of network service functions on a computer network, the method comprising:
   sending a request packet from a discovery source to a first service function of the chain of network service functions on the computer network;
   encapsulating the request packet with a network service header at the first service function, wherein the network service header comprises an identifier of the request packet as being an Operations, Administration and Maintenance (OAM) packet and an OAM payload;
   inserting metadata identifying the first service function into the OAM payload at the first service function;
   forwarding the request packet from the first service function to one or more subsequent service functions in the chain of network service functions and each of the one or more subsequent service functions inserts additional metadata identifying a respective one of the one or more subsequent service functions into the OAM payload, before the each of the one or more subsequent service functions forwards the request packet to another of the one or more subsequent service functions, until the request packet is received by an egress service function, wherein when forwarded by the one or more subsequent functions, the request comprises metadata comprising the metadata identifying the first service function and the additional metadata identifying each of the one or more subsequent service functions;
   returning the request packet from the egress service function to the discovery source; and
   mapping the chain of network service functions at the discovery source based on the combined metadata to form a topology of the computer network from the order of linkage of the chain of the network service functions.

2. The method of claim 1, wherein the OAM payload further comprises an OAM function type, wherein the OAM function type comprises one of a process-and-forward type and a reply type.

3. The method of claim 1, wherein OAM payload further comprises OAM function data comprising metadata related to one or more network service functions of the chain of network service functions that have been identified.

4. The method of claim 1, further comprising setting a time-to-live (TTL) value in the network service header of the request packet.

5. The method of claim 1, further comprising decrementing a TTL value in the network service header of the request packet.

6. The method of claim 1, wherein the request packet further comprises an identifier of a service function type stored as a type-length-value (TLV) sequence.

7. The method of claim 1, further comprising returning an error code packet to the discovery source if a request of the received request packet is not supported.

8. A method of verifying a service function on a computer network, the method comprising:
   encapsulating a request packet with a network service header at a discovery source, wherein the network service header comprises an identification of the request packet as being an Operations, Administration and Maintenance (OAM) packet and an OAM payload;
   sending the request packet from the discovery source to a first service function of a service function chain on the computer network, wherein the request packet comprises metadata identifying a service function type and the service function is verified by validating the service function's function;
   determining if a service function type of the first service function matches the service function type identified by the metadata at the first service function;
   responsive to the service function type of the first service function matching the service function type identified by the metadata, sending a response from the first service function to the discovery source indicating that the service function has been identified; and
   responsive to the service function type of the first service function not matching the service function type identified by the metadata, forwarding the request packet from the first service function to a second service function in the service function chain and adding additional metadata to the request packet at the second service function to form a combination of the metadata and the additional metadata in the request packet.

9. The method of claim 8, further comprising setting a time-to-live (TTL) value of the request packet based on the number of service function hops through the service function chain required to reach a destination service function on the computer network.

10. The method of claim 8, wherein the service function type is one of deep packet inspection, firewall, load balancer, and policy configuration.

11. The method of claim 8, further comprising decrementing a TTL value at each service function said request packet hops through.

12. The method of claim 8, wherein an identifier of the service function type is stored as a type-length-value (TLV) sequence.

13. The method of claim 8, further comprising returning an error code to the discovery source if a request of the request packet is not supported by the first or second service function.

14. The method of claim 8, wherein the network service header identifies a request type of the request packet.

15. An apparatus for mapping a topology of a service function chain on a computer network, comprising:
   a circuit determining the topology by forming an Operations, Administration and Maintenance (OAM) packet with a network service header, sending the OAM packet to a service function of a service function chain on the computer network,
   the service function chain comprising a plurality of service functions chained together on the computer network, wherein the last service function in the service function chain is an egress service function, and wherein each of the plurality of service functions:
      receive the OAM packet;
      add metadata identifying a function type of the service function to the OAM packet;
      return the OAM packet to the circuit in response to the service function being an egress service function; and
      forward the OAM packet to a next service function in the service function chain in response to the service function not being an egress service function, and adding additional metadata at the next service function identifying a function type of the next service function to the OAM packet; and
   the circuit mapping an order of the service function chain received from an ingress service function to the egress service function on the computer network based on the metadata and additional metadata accumulated and combined at each service function in the service function chain, the metadata and the additional metadata describing the identified function type of the service function and the next service function, in the OAM packet received from the egress service function to form the topology.

16. The apparatus of claim 15, wherein the circuit sets a time-to-live (TTL) value in the network service header to 1.

17. The apparatus of claim 15, wherein the plurality of service functions decrement a TTL value in the network service header.

18. The apparatus of claim 15, wherein the plurality of service functions add the metadata to the OAM packet as a type-length-value (TLV) sequence.

19. The apparatus of claim 15, wherein the plurality of service functions return an error code to the circuit in response to a request of the request packet not being supported by any service function.

20. The method of claim 8, wherein the service function type is obtained by a verification list accessible by the discovery source.

* * * * *